Patented July 27, 1937

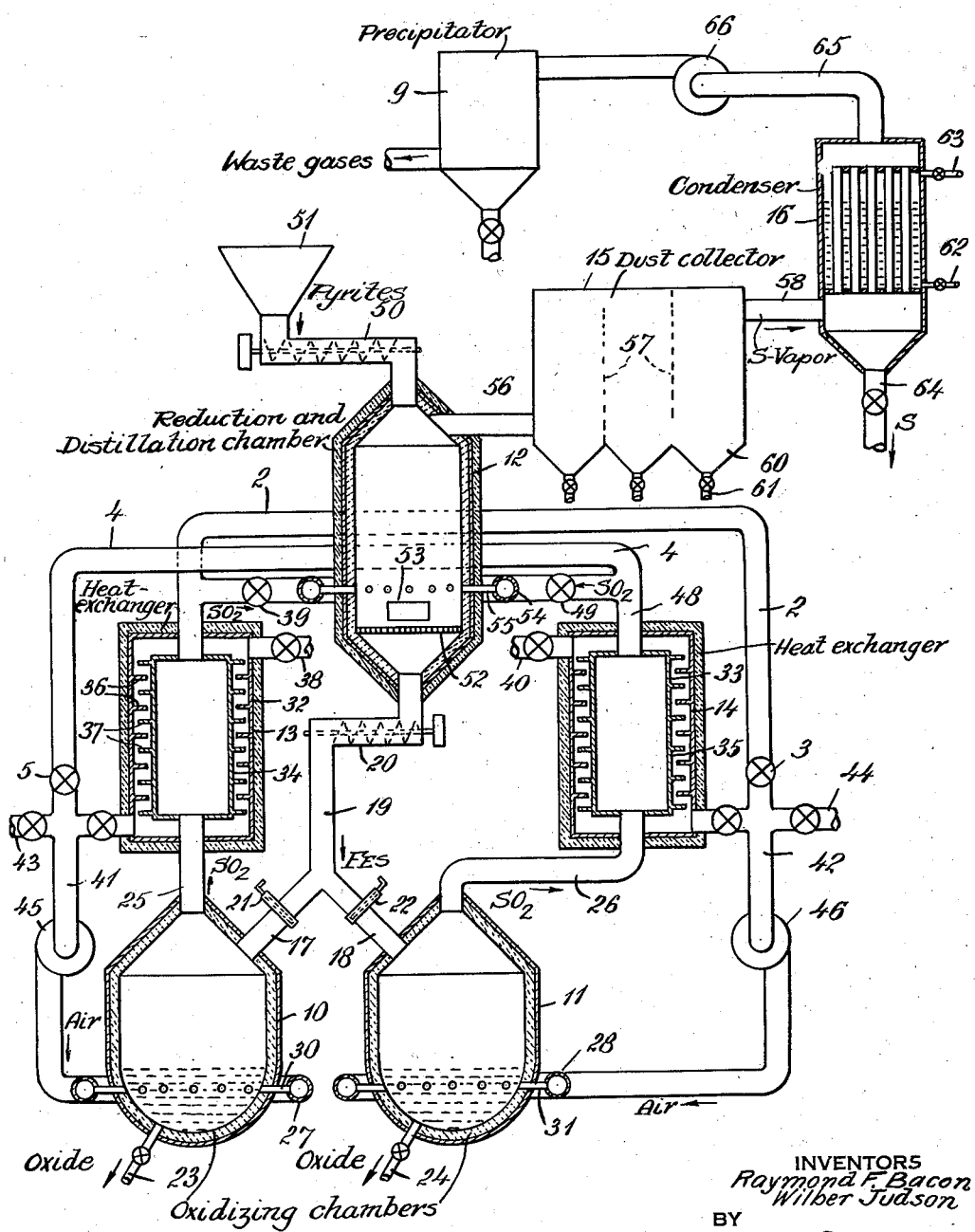

2,087,894

UNITED STATES PATENT OFFICE 2,087,894

RECOVERY OF SULPHUR

Raymond F. Bacon, Bronxville, N. Y., and Wilber Judson, Newgulf, Tex.

Application October 18, 1934, Serial No. 748,953

2 Claims. (Cl. 23—226)

This invention relates to the recovery of sulphur and has for an object the provision of an improved process and apparatus for recovering elemental sulphur from metal sulphide-bearing material. More particularly, the invention contemplates the provision of an improved process and apparatus for recovering elemental sulphur from pyrites.

The present invention contemplates the effective utilization of heat capable of being developed by reactions involved in or associated with the oxidation of pyrites for the recovery of the volatile sulphur of the pyrites in elemental form. The method of the invention involves the oxidation of an iron sulphide product resulting from the distillation of pyrites under such conditions as to produce sufficient heat to effect the distillation of the pyrites.

According to the preferred method of the invention, the iron sulphide residue from a pyrites distillation operation is subjected while molten to an oxidizing operation to produce iron oxide and a gaseous product containing sulphur dioxide. The oxidizing operation is so controlled that a substantially oxygen-free gaseous product containing sufficient heat to effectively distill the volatile sulphur of the quantity of the pyrites required to produce iron sulphide for the oxidizing operation is formed. Distillation of the volatile sulphur of the pyrites is accomplished by suspending the pyrites, in finely divided form, in the hot gaseous product of the oxidizing operation. The residue resulting from distillation of the pyrites, consisting substantially of the monosulphide of iron, is treated in the oxidizing operation. The gaseous product of the distillation operation, containing the volatile sulphur of the pyrites in elemental form and the sulphur dioxide produced in the oxidizing operation may be treated for the recovery of the sulphur of the sulphur dioxide either before or after cooling to condense the elemental sulphur.

The invention will be better understood from a consideration of the following description in conjunction with the accompanying drawing showing schematically apparatus which may be employed in carrying out a process of the invention.

The apparatus shown in the drawing comprises oxidizing chambers 10 and 11 in the form of molten bath receptacles, a distillation chamber 12, heat exchangers 13 and 14, a dust collector 15, a condenser 16 and an electrical precipitator 9, all so connected by suitable means that iron sulphide-bearing material may be delivered from the distillation chamber to the oxidizing chambers and gases from the oxidizing chambers may be utilized in the distillation operation and then be subjected progressively to dust removing, cooling or condensing and precipitating treatments.

The oxidizing chambers 10 and 11 are similar in structure to ordinary copper converters, each comprising a steel outer shell lined with refractory material such as magnesite brick. The upper portions of the oxidizing chambers communicate through branch conduits 17 and 18 and a main conduit 19 with a screw conveyor 20 which is adapted to deliver materials to be treated from the lower portion of the distillation chamber to the oxidizing chambers. The branch conduits 17 and 18 are provided with dampers or valves 21 and 22 which may be manipulated to close off one or both of the oxidizing chambers from communication with the screw conveyor 20. The screw conveyor 20 is so constructed and arranged that materials may be delivered from the distillation chamber to the oxidizing chambers without admitting air to any chamber. The lower portions of the oxidizing chambers are provided with tapping spouts 23 and 24 through which the molten oxidized product may be withdrawn upon completion of the oxidizing treatment.

The upper portions of the oxidizing chambers are tightly connected to conduits or flues 25 and 26 which are, in turn, tightly connected to the heat exchangers 13 and 14. Annular manifolds 27 and 28 surrounding the oxidizing chambers and communicating therewith through tuyères 30 and 31 are provided for introducing air into the oxidizing chambers.

The oxidizing chambers may be stationary or mounted for tilting movement on any suitable type of supporting structure.

The heat exchangers 13 and 14 comprise inner chambers 34 and 33 formed of good heat conducting material and heat insulated jackets 32 and 35 surrounding the inner chambers and having their walls spaced from the walls of the inner chambers to provide passages therebetween. The passages between the inner chambers 32 and 33 and the jackets 34 and 35 of the heat exchangers are provided with staggered baffles 36 and 37 for providing tortuous paths of travel for gases. Air may be admitted to the passages between the inner chambers and the jackets through inlets 38 and 40, and heated air may be withdrawn through conduits 41 and 42 which communicate with the manifolds 27 and 28 associated with the oxidizing chambers. Air inlets 43 and 44, open to the atmosphere or connected to suitable sources of air under pressure (not shown), communicate with the conduits 41 and 42. Blowers 45 and 46 are included in the conduits 41 and 42 to cause air to flow through the heat exchangers and to aid in introducing air and other oxidizing gases into the oxodizing chambers.

Conduits 47 and 48 having valves 39 and 49 included therein provide passages for conducting hot gases from the inner chambers 32 and 33 of the heat exchangers to the distillation chamber 12. The conduit 47 leading from the oxidizing chamber 10 and heat exchanger 13 is connected to the conduit 42 (through which oxidizing gases are introduced into the oxidizing chamber 11) ahead of the blower 46 by means of a conduit 2 having a valve 3 included therein. Similarly, the conduit 48 leading from the oxidizing chamber 11 and heat exchanger 14 is connected to the conduit 41 (through which oxidizing gases are introduced into the oxidizing chamber 10) ahead of the blower 45 by means of a conduit 4 having a valve 5 included therein. The valves 3, 5, 39, and 49 may be manipulated to pass the gaseous product from chamber 10 through a molten bath in chamber 11 or the gaseous product from chamber 11 through a molten bath in chamber 10.

The distillation chamber is an upright cylindrical chamber lined with heat refractory material and covered with heat insulating material. The upper portion of the distillation chamber communicates with a screw conveyor 50 which is adapted to deliver pyrites for treatment from a storage hopper 51 to the distillation chamber. The screw conveyor 50 is so constructed and arranged that materials may be delivered to the distillation chamber without admitting air. The distillation chamber is provided with a grate 52 for collecting agglomerations too large for convenient passage through the conveyor 20. A work hole 53 provided with a suitable removable cover permits access to the interior of the chamber for the purpose of breaking or removing agglomerations collected on the grate 52. An annular manifold 54 surrounding the distillation chamber and communicating therewith through tuyères 55 is provided for introducing hot gases from the conduits 47 and 48 leading from the heat exchangers into the interior of the distillation chamber.

A conduit 56 provides a passage for conducting gases from the upper portion of the distillation chamber to the interior of the dust collector 15. The dust collector is provided with a series of baffles 57 so arranged as to provide a tortuous path for the flow of gases between the inlet conduit 56 and an outlet 58. The bottom of the dust collector is provided with a number of hoppers 60 for the reception of dust particles removed from the gas stream. The hoppers 60 are provided with valved outlets 61 through which dust particles collected in the hoppers may be withdrawn. The dust collector outlet 58 communicates with the lower portion of the condenser 16.

The condenser 16 is in the form of a fire tube boiler provided with a valved inlet 62 for water and a valved outlet 63 for steam. Condensate formed in the condenser may be withdrawn from the lower portion thereof through a valved outlet 64. Gases may be conducted from the condenser through an outlet conduit 65 having a fan 66 included therein to the electrical precipitator 9 which may be of any suitable construction.

In employing the apparatus illustrated in the drawing for carrying out a method of the invention, pyrites in finely divided form, preferably minus 40-mesh, is introduced into the upper portion of the distillation chamber 12 from the storage hopper 51 by means of the screw conveyor 50. The pyrites particles, in passing downwardly through the distillation chamber encounter an upwardly rising current of hot gases from the oxidizing chambers and heat exchangers introduced into the distillation chamber through the tuyères 55. The particles of pyrites are heated by the gases to a temperature at which distillation of the volatile sulphur of the pyrites is effected. The gaseous product containing the sulphur dioxide produced in the oxidizing chambers and the volatile sulphur of the pyrites in the form of elemental sulphur vapor and a solid product comprising the residue of the pyrites, substantially in the form of monosulphide of iron, are thus produced. The gaseous product passes to the dust collector 15 through the outlet conduit 56. The solid residue from the pyrites is delivered to the screw conveyor 20 which conveys it to the oxidizing chambers 10 and 11.

The iron sulphide-bearing material passes from the conveyor 20 through the main conduit 19 and the branch conduits 17 and 18 into molten baths in the bottoms of the oxidizing chambers.

Operation of the oxidizing chambers may be initiated by melting a small charge of iron sulphide-bearing materials in the chambers by combustion of any suitable fuel or by retaining portions of molten baths produced in preceding operations.

Air is introduced into the molten baths within the oxidizing chambers through the tuyères 30 and 31. The oxygen of the air reacts with the iron sulphide to produce gaseous sulphur dioxide and molten iron oxide. The oxidation reaction is carried out at a temperature substantially above 1000° C., and advantageously at about 1200° C. The introduction of iron sulphide-bearing material into the oxidizing chambers may be continued for periods varying from one to several hours until the operating capacity of each chamber has been reached. When charging has been completed, blowing is continued until substantially all sulphur has been removed. The resulting molten baths, consisting largely of iron oxide are then removed through the tapping spouts. Preferably, the operations of the two oxidizing chambers are staggered in order to permit charging and tapping at different times and thus permit continuous operation of the process and the production of a substantially uniform sulphur dioxide product.

The sulphur dioxide, together with the inert gases introduced into the oxidizing chambers with the air, passes through the conduits 25 and 26 to the heat exchangers 13 and 14. The gases entering the heat exchangers, after having been cooled to the desired temperature, preferably in the neighborhood of 1000° C., flow through the conduits 47 and 48 to the manifold 54 from where they enter the distillation chamber through the tuyères 55.

The oxidizing operations are preferably so controlled that substantially oxygen-free gaseous products containing sulphur dioxide are introduced into the distillation chamber. Preferably, the gaseous products introduced into the distillation chamber contain not more than about one percent of free oxygen.

When the sulphur content of a charge in an oxidizing chamber is nearly exhausted, the oxygen content of the gaseous product tends to increase. Introduction of the resulting gaseous product of relatively high oxygen content into the distillation chamber may be avoided by passing the gaseous product through a molten bath of higher sulphur content in another oxidizing chamber.

When the charges in the oxidizing chambers contain sufficient sulphur to insure the production of substantially oxygen-free gaseous products, the operations are conducted with valves 39 and 49 open, valves 3 and 5 closed and the valves associated with the air inlets 43 and 44 and the air passages of the heat exchangers suitably adjusted to provide satisfactory volumes of oxidizing gas at proper temperatures. When the sulphur content of one of the charges becomes reduced to the point at which the oxygen content of the gaseous product increases to an undesirable amount, the gaseous product is passed in series with the other oxidizing chamber. In the staggered operation of the oxidizing chambers, the oxidizing operations are commenced at different times, and a charge containing sufficient sulphur to insure the production of a substantially oxygen-free gaseous product will always be undergoing treatment. Staggering of the operations is carried out to maintain in one chamber a charge containing sufficient sulphur to insure the production of a substantially oxygen-free gaseous product until the sulphur of the charge in the other chamber has been substantially completely eliminated and the treatment of a fresh charge has been commenced after removal of the substantially sulphur-free charge.

The gaseous product formed in chamber 10 may be passed through a molten charge in chamber 11 by opening the valve 3, closing the valve 39 and suitably adjusting the valves associated with the air inlet 44 and the air passage in the heat exchanger 14 to cause a flow of gases from the conduit 2 through the conduit 42 and blower 46. Similarly, the gaseous product formed in chamber 11 may be passed through a molten bath in chamber 10 by opening the valve 5, closing the valve 49 and suitably adjusting the valves associated with the air inlet 43 and the air passage in the heat exchanger 13 to cause a flow of gases from the conduit 4 through the conduit 41 and blower 45.

The sulphur-laden gases from the upper portion of the distillation chamber are introduced into the dust collector 15 through the conduit 56 and flow through the dust collector to the outlet 58. During the course of the passage of the sulphur-laden gases through the dust collector, substantially all dust particles are removed. The cleaned gases passing out of the dust collector through the conduit 58 enter the condenser 16 in which a temperature sufficiently low to effect condensation of the sulphur vapor contained in the gases is maintained. A temperature of about 115° C. to 150° C. is preferably maintained in the condenser. Sulphur dioxide-bearing gases are conducted from the condenser through the conduit 65 to the electrical precipitator 9 in which entrained sulphur particles may be removed. Molten sulphur collected in the lower portion of the condenser is withdrawn through the outlet 64. Sulphur dioxide-bearing gases expelled from the electrical precipitator may be treated in any suitable manner for the recovery of the sulphur dioxide or for the recovery in elemental form of the sulphur of the sulphur dioxide.

It is to be understood that the apparatus illustrated in the drawing is merely illustrative and is not intended to be restrictive of the invention in any respect.

We claim:

1. The method of producing elemental sulphur which comprises subjecting iron sulphide-bearing material in the form of a molten bath to an oxidizing operation in such manner that a gaseous product containing sulphur dioxide and some free oxygen is produced, passing said gaseous product through a second molten bath of iron sulphide-bearing material in such manner that at least a part of the free oxygen is eliminated from the gaseous product, and passing the resulting gaseous product in contact with finely divided pyrites in a suspension distillation chamber in such manner as to effect suspension distillation from the volatile sulphur of the pyrites.

2. The method of producing elemental sulphur which comprises subjecting iron sulphide-bearing material in the form of a molten bath to an oxidizing operation in which an oxidizing gas is passed in contact with the iron sulphide-bearing material in such manner that a gaseous product containing sulphur dioxide and initially less than about one per cent of free oxygen is produced, passing the resulting gaseous product, while the oxygen content thereof remains below approximately one per cent, in contact with finely divided pyrites in a suspension distillation chamber in such a manner as to effect suspension distillation of the volatile sulphur of the pyrites, and passing the gaseous product through a second molten bath of iron sulphide-bearing material prior to the distilling operation when the oxygen content of the gaseous product from the first molten bath exceeds approximately one per cent.

RAYMOND F. BACON.
WILBER JUDSON.